Jan. 15, 1935. J. J. DRABIN 1,988,192
BATTERY CONTROL
Filed Feb. 5, 1934
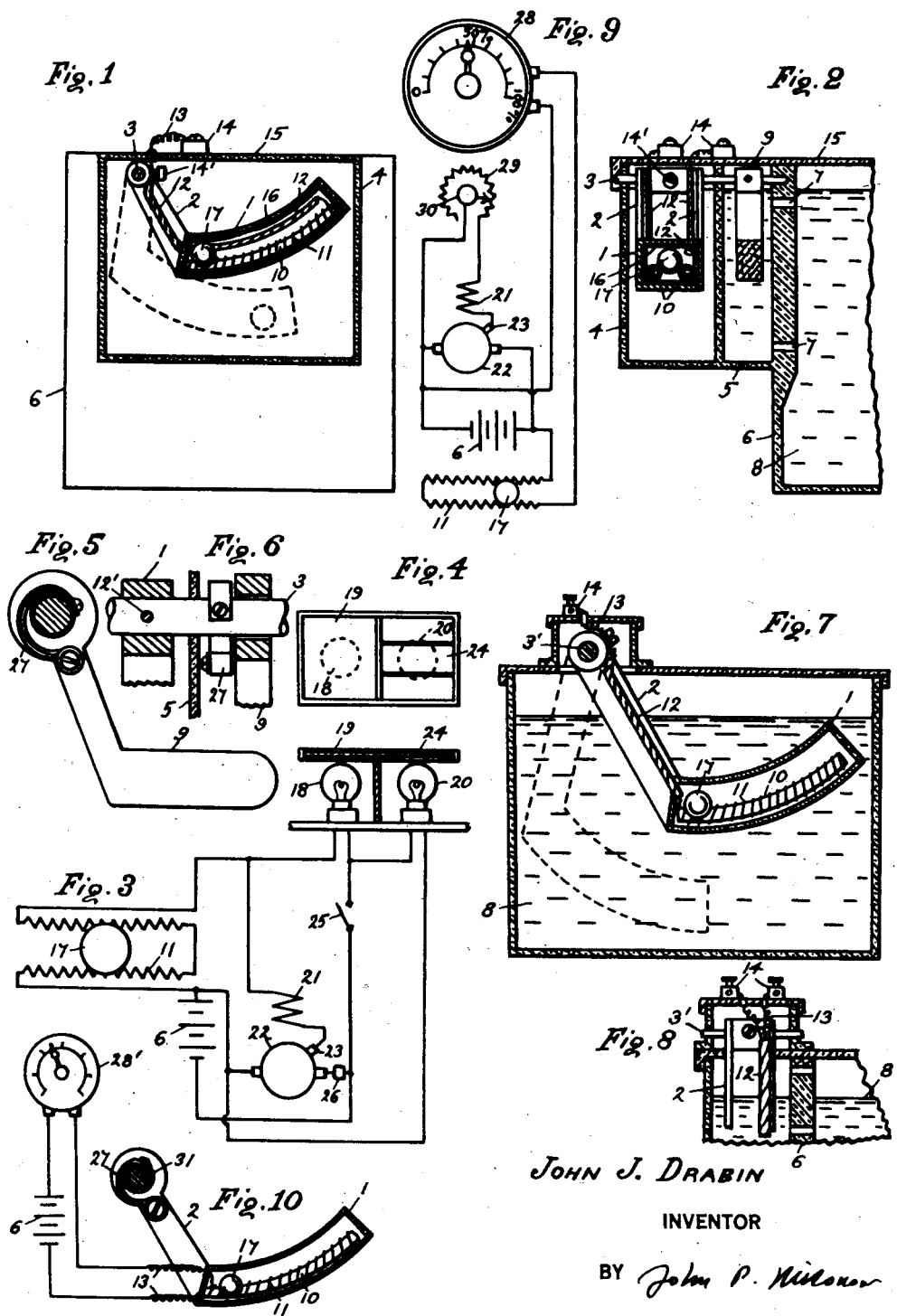
John J. Drabin
INVENTOR
BY John P. Nilson
ATTORNEY Patented Jan. 15, 1935

1,988,192

UNITED STATES PATENT OFFICE 1,988,192

BATTERY CONTROL

John J. Drabin, New York, N. Y.

Application February 5, 1934, Serial No. 709,757

4 Claims. (Cl. 171—314)

My invention relates to a battery control and has a particular reference to apparatus for indicating the degree of charge of a storage battery and for automatically adjusting the field excitation of a battery charging generator in accordance with the degree of charge of the battery.

The object of my invention is to provide an indicator placed at a convenient point of observation, for indicating the charge of a battery by measuring the specific gravity of its electrolyte.

Another object of my invention is to provide an automatic means controlled by the specific gravity of the electrolyte of a battery for regulating the field of a battery charging generator in order to feed heavier current into the battery when it is more or less discharged, and to reduce the current when the battery is charged.

Another object of my invention is to provide means for automatically regulating the readings of my battery charge indicator in accordance with the temperature variations of its electrolyte.

For this purpose I provide a hollow float suspended in the electrolyte and provided with a resistor and a movable contact member for changing the resistance with different positions of the float in the electrolyte, as determined by the variations in its specific gravity. This variable resistance is then included in a circuit with a battery and a milliammeter suitably calibrated.

My invention is more fully described in the accompanying specification and drawing in which—

Fig. 1 is a sectional elevation of a resistor used in my apparatus, Fig. 2 is a sectional elevation of the resistor and float in a storage battery, Fig. 3 is a diagram of connection of my battery control, Fig. 4 is a front view of indicating lamps, Fig. 5 is a detail view of the float, Fig. 6 is a detail view of the attachment of the float and resistor housing, Fig. 7 is a sectional elevation of a modified floating resistor, Fig. 8 is a partial sectional view of same in another projection, Fig. 9 is a diagram of connections of a modified arrangement corresponding to the Fig. 7, and Fig. 10 is a diagrammatic view of another modification.

My battery control consists of a hollow member 1 of an arcuate shape and provided with lugs 2 at one end with which it is attached to a shaft 3. The shaft is rotatively supported in the walls of vessels 4 and 5 attached to one side of a battery jar 6. The vessel or well 5 has holes 7 in the wall separating it from the jar 6 so that the battery electrolyte 8 stays in the vessel 5 at the same level as in the battery itself. A float 9 is attached to the shaft in the vessel 5 and is immersed in the electrolyte. The float 9 has a shape similar to the shape of the member 1. It is shown separately in Figs. 5 and 6.

The system consisting of the float 9 and the hollow member 1 is balanced so that the float remains suspended in the electrolyte, rising higher when the battery is fully charged and the electrolyte has the greatest specific gravity, and dropping lower in a discharged battery. The chamber in the member 1 has two insulation rods 10 with resistor wires 11 wound on them. These wires are connected together at the end of the member 1 and are connected with a cable 12 with flexible leads 13 connected to terminals 14 on a cover 15 of the battery. The housing 1 is made of an insulating material or is lined up inside with an insulation 16. A metal ball 17 is placed on the resistors 11. It can roll on the resistors tending to remain in the lowest position between two extremes as shown in Fig. 1. The resistors 11 are connected with the battery 6 and with an indicator 18 on the dashboard of an automobile, if the device is used for an automobile battery, or at any suitable observation point. The simplest indicator represents an ordinary electric lamp placed under a transparent screen 19 side by side with another similar lamp 20 fed directly from the battery. By comparing the light of the indicator lamp 18 with the light of the control lamp 20 it is possible to judge of the charge of the battery, the weakest light, with part of the resistor short circuited by the ball 17, corresponding to the fully charged battery. The resistors 11 are connected in series with a shunt field winding 21 of a battery charging generator 22. The field winding may be connected with the third brush 23. The control lamp 20 has also a screen 24 having three or more sections of different transparency in order to facilitate the gauging of the illumination of the indicator lamp 18.

A switch 25 connecting the resistor and the indicator lamp with the battery may be conveniently placed on the dashboard and may be connected so as to automatically close the circuit when the engine ignition or instrument light switch is closed. The generator may have the cut-out switch 26.

The float 9 may be connected with the shaft 3 by means of a flat spring 27 made of two metals having different coefficients of expansion, for instance, iron and bronze or copper, adjusted so that the temperature variations will change the angle between the float and the resistor sufficiently to compensate for the effect of the temperature on the electrolyte, so as to short circuit a greater portion of the resistor when the temperature decreases. With this arrangement the battery will receive an additional or increased charge during the winter months when there is a greater drain on the battery current and less driving at the daytime, thereby eliminating the necessity of adjusting the generator third brush for winter and summer driving.

With the arrangement shown in Figs. 1, 2 and 3, it is necessary that the resistor should be largely cut out or short circuited when the battery is discharged in order to have then the strongest charging current of the generator (with the strongest field excitation). For this purpose it is convenient to extend the cable 12 to the end of the resistor chamber as shown in Figs. 1 and 2. Then with the heavy electrolyte corresponding to the charged battery the float will rise to its highest point and the ball 17 will roll to the left cutting in most of the resistance. The lamp 18 will then glow dimly. The connection in Figs. 7 and 8 can be used when the resistor is not connected with the generator field.

The resistor chamber 1 is shown in Figs. 1 and 2 placed in a separate chamber 4 without electrolyte. This arrangement is necessary in view of the fact that the generator field requires a more or less heavy current, from one quarter to one ampere, and with such a current there will be considerable heating of the resistor, which in turn will heat the electrolyte. The arrangement of two chambers, 4 and 5, is not necessary when the resistor is not connected with the generator field. The separate float 9 may be then omitted as shown in Figs. 7 and 8, the resistor chamber 1 being used as a float. The wires 11 may be connected at the free end of the housing 1, so that the strongest current, with the resistor largely short circuited, will be with the heaviest electrolyte. The resistor can be then connected with an indicator 28 suitably calibrated, for instance, in percentage of the full charge. An ordinary milliammeter can be used for this purpose. With a very small current requirement for this meter, the resistor can be placed directly into the electrolyte as shown in Fig. 7 with the resistor chamber 1 made air-tight. A manual generator control can be used with this arrangement as shown in Fig. 9. A hand operated rheostat 29 is placed on the dashboard near the meter 28 so that when the latter indicates a discharged battery, the rheostat handle 30 may be turned to the right in order to short circuit the rheostat and to increase the generator field current.

The float 9 may be made of hard rubber or similar material properly weighted, or it may be made of an acid-proof metal with a hollow space inside.

The shaft 3' turns in the bearings in the walls of the battery and the housing or chamber 5. The bimetallic spring 27 can be also used when the separate float 9 is omitted. In such a case one end of the spring is attached to some stationary object, for instance, to a shaft 31 the latter being made stationary. The position of the resistor housing 1 in this case is determined partly by the gravity of the electrolyte, partly by the resistance of the spring 27. Temperature effect will change this position thereby introducing the necessary corrections into the indicator readings or into the voltage regulation by the scheme shown in Fig. 3. The spring 27 can be made sufficiently stiff to support the floating chamber 1 in water, or, even, in the air. With the gravity of the liquid remaining constant the device (Fig. 10) can be used for measuring the temperature of the liquid, for instance, the temperature of the water in the engine radiator.

The floating chamber 1 must be fully immersed in the electrolyte, so that it is not necessary to maintain a constant level of the latter. It is necessary, however, to maintain the consistency of the electrolyte constant, and this can be accomplished by maintaining the constant level by a suitable device.

With a battery containing more than one cell, the chamber 5 may be connected with one cell only. In that case the wall of the battery jar 6 may have some added thickness as shown in Fig. 2 so as to reduce the space inside of the jar by a volume corresponding to the volume of the electrolyte in the chamber 5. Then the amount of the electrolyte in all cells will be the same.

The resistor housing 1 can be removed from the shaft 3 in case when the battery becomes worn out and is replaced by a new one. The housing may be then used with the new battery. The float 9 and the shaft 3, being comparatively inexpensive, may go with the old battery.

With the resistor connections shown in Fig. 3 the generator construction may be simplified by omitting the third brush adjustment arrangement. The lamps and the indicator may be omitted, in which case it will be possible to judge of the charge of the battery by the ammeter readings at a certain speed of the automobile. Then seasonal adjustments (or for various special purposes, such as excessive night driving etc.) can be made by changing the angle between the float and the resistor housing by means of the screw 14'.

I claim:

1. In a battery charging system in which a generator having a field winding is connected to a storage battery, the combination with a hollow member movably supported in the electrolyte of said battery, said member being adapted to float in said electrolyte and to take higher or lower positions in accordance with the variations in the specific gravity thereof, a resistor supported inside of said member, leads extending from said resistor to the outside of said battery and connected to said field winding, and a contact member rollingly supported on said resistor and adapted to short circuit a portion of said resistor, said contact member being further adapted to move on said resistor by the force of gravity so as to take the lowest positions corresponding to different positions of said hollow member in said electrolyte.

2. In a battery charging system in which a generator having a field winding is connected to a storage battery, the combination with a hollow member rotatively supported at one end in the electrolyte of said battery, the free portion of said member being adapted to float in said electrolyte, a curved resistor supported in said member, leads extending from said resistor outside of said battery and connected to said field winding, and a contact member adapted to roll by gravity on said resistor and to short circuit a portion of said resistor thereby changing the current through said field winding for different positions of said hollow member in said electrolyte in accordance with the changes in its specific gravity.

3. In a battery charging system in which a generator having a field winding is connected to a battery, the combination with a hollow member rotatively supported at one end in the electrolyte of said battery, the free portion of said member being adapted to float in said electrolyte, a curved resistor in said member, said resistor being formed of two parallel portions, leads extending from said resistor to said field winding, and a metal ball adapted to roll by gravity over said resistor and to short circuit a variable portion thereof depending on the position of said member in said electrolyte, said resistor with said ball being arranged so as to reduce the electric current in said field winding when the specific gravity of said electrolyte is increased.

4. In a battery charging system in which a generator having a field winding is connected to a battery, the combination with a float, one end of said float being rotatively supported in said battery, the main portion of said float being immersed in said electrolyte and adapted to change its position therein in accordance with the changes in the specific gravity of said electrolyte, a hollow member, a bimetallic spring connecting said float and said hollow member and adapted to change the relative positions of said float and said member in accordance with the temperature changes, a curved resistor in said hollow member, and a contact member adapted to roll by gravity on said resistor and to short circuit a portion thereof, said resistor being connected to said field winding and said battery.

JOHN J. DRABIN.